United States Patent [19]

Bosma

[11] 4,022,180

[45] May 10, 1977

[54] ENGINE IGNITION GROUNDING SWITCH

[75] Inventor: David J. Bosma, New Holstein, Wis.

[73] Assignee: Tecumseh Products Company, Tecumseh, Mich.

[22] Filed: Feb. 23, 1976

[21] Appl. No.: 660,167

[52] U.S. Cl. .......................... 123/198 DC; 56/10.5

[51] Int. Cl.$^2$ .................... F02B 77/00; A01D 75/28

[58] Field of Search .... 123/198 D, 198 DC, 198 R, 123/179 SE; 56/10.2, 10.3, 10.4, 10.5, DIG. 15; 200/275, 284, 302

[56] References Cited

UNITED STATES PATENTS

| | | | |
|---|---|---|---|
| 2,434,871 | 1/1948 | Taft | 123/198 DC |
| 2,791,207 | 5/1957 | Rayniak | 123/99 |
| 2,908,263 | 10/1959 | Brown | 123/98 |
| 3,099,735 | 7/1963 | Roeser | 200/284X |
| 3,175,066 | 3/1965 | Fiddler | 200/284 X |
| 3,194,224 | 7/1965 | Lechtenberg | 123/119 R |
| 3,228,177 | 1/1966 | Coates | 56/10.5 |
| 3,273,552 | 9/1966 | Plath | 123/198 DC |
| 3,487,183 | 12/1969 | Schulman | 123/198 DC X |
| 3,726,264 | 4/1973 | Lariviere | 123/198 DC X |
| 3,863,618 | 2/1975 | Scholz | 123/198 DC |

*Primary Examiner*—C. J. Husar
*Assistant Examiner*—Ira S. Lazarus
*Attorney, Agent, or Firm*—Barnes, Kisselle, Raisch & Choate

[57] ABSTRACT

An ignition grounding switch for low-horsepower internal combustion engines in which a wire terminal electrically connected to the engine magneto is fixedly disposed within a cored insulator block, and is engaged by and spring biased over a grounded throttle control lever as the latter is moved to the engine-off position, such that the magneto is connected to electrical ground through the terminal and the control level.

11 Claims, 5 Drawing Figures

Fig-1
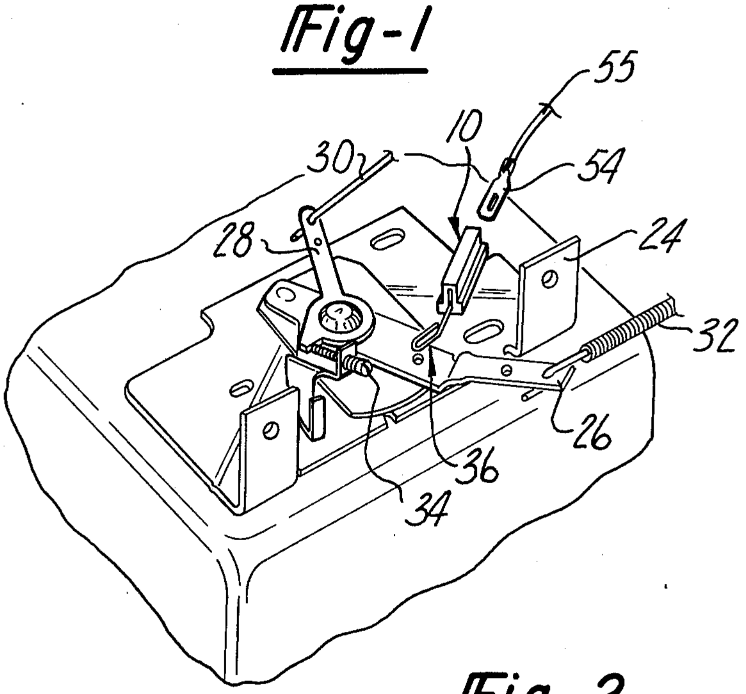
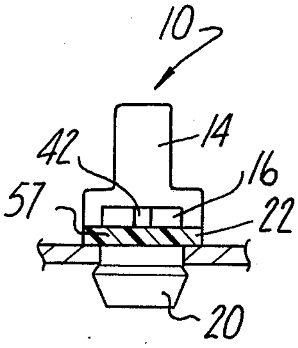
Fig-4
Fig-2
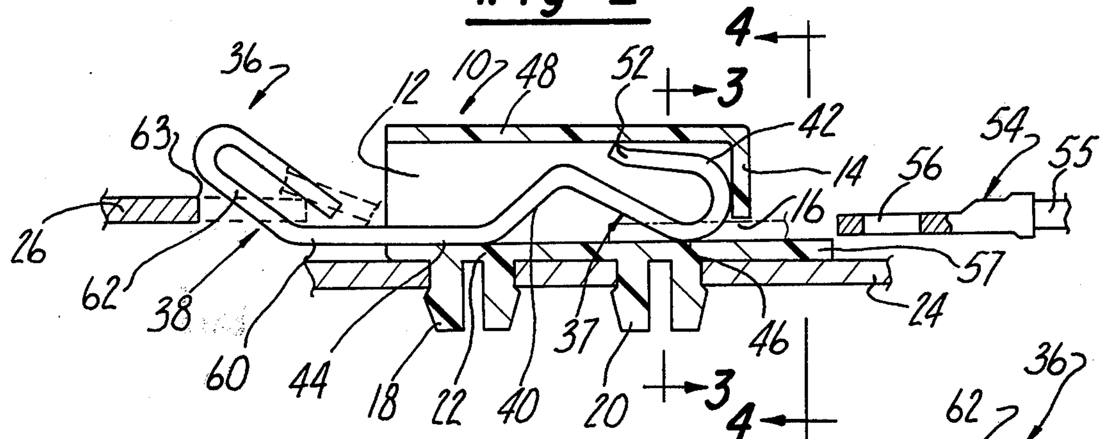
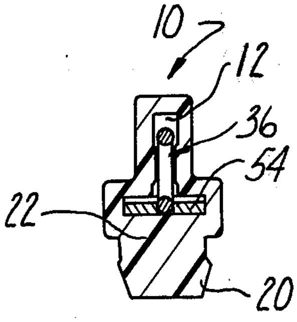
Fig-3
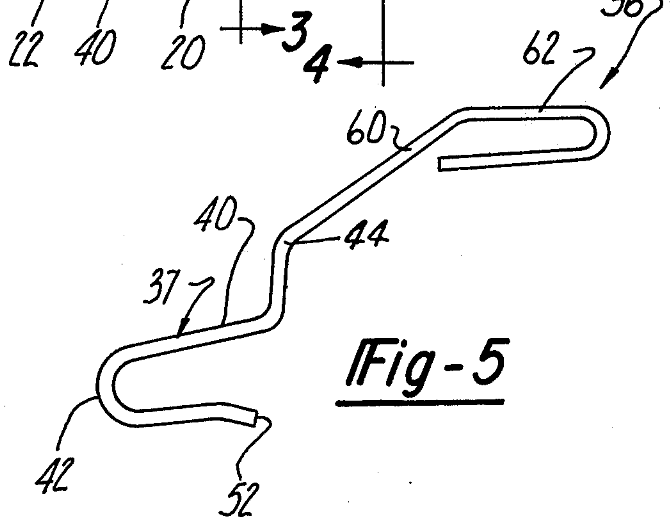
Fig-5

ENGINE IGNITION GROUNDING SWITCH

The present invention relates to internal combustion engines and, more particularly, to an engine ignition grounding switch by means of which the engine may be stopped.

Objects of the present invention are to provide an improved ignition grounding switch particularly adapted for use in combination with low-horsepower internal combustion engines of the type widely used to power lawn mowers or the like and which is economical to manufacture and assemble, and which is reliable in operation. More specifically, it is an object of the invention to provide an improved ignition grounding switch of the described type having fixed and movable contact members in which spring-bias forces in the fixed contact member are utilized in such a manner that electrical connection between the fixed and movable members is facilitated when the two come into mechanical contact despite an accumulation of dirt, grease or grime, etc. on one or both of the members.

The novel features which are considered to be characteristic of the present invention are set forth in particular in the appended claims. The invention itself, however, together with additional objects, features and advantages thereof, will be best understood from the following description when read in conjunction with the accompanying drawings in which:

FIG. 1 is a perspective view of a presently preferred embodiment of the engine ignition grounding switch provided by the present invention carried on a carburetor control bracket of an internal combustion engine;

FIG. 2 is an elevational sectional view longitudinally bisecting the engine ignition grounding switch shown in FIG. 1;

FIGS. 3 and 4 are sectional views respectively taken along the lines 3—3 and 4—4 of FIG. 2; and FIG. 5 is an elevational view of a shorting terminal of the switch shown by itself in its free state condition.

Referring to FIG. 1, a throttle control lever 26 and a coaxial control follower 28 are conventionally mounted for corotation on a carburetor control bracket 24 which is fixedly carried on an engine adjacent the carburetor (not shown). Follower 28 is connected to the carburetor throttle valve (not shown) by a link 30, and control lever 26 is connected to a suitable operator-responsive control mechanism (not shown) by a Bowden cable 32. Control lever 26 is connected via bracket 24 to engine electrical ground, i.e., the engine block. Follower 28 is biased by a carburetor valve return spring (not shown) into abutment with the usual idle adjustment screw 34 carried by lever 26. It is conventional in construction of low-horsepower internal combustion engines adapted for use on lawn mowers or the like to locate throttle control lever 26, control follower 28 and screw 34 below rather than above mounting plate 24 in assembly, to thereby protect the control lever and follower from unwanted contact and damage, and to help protect against an accumulation of dust and dirt, etc. on the control mechanism. Hence, the lever and follower are mounted to the underside of bracket 24, the composite assembly shown in FIG. 1 being thus viewed upwardly from beneath the control bracket.

Referring to FIGS. 1–4, the engine ignition grounding switch provided by the present invention includes an elongated block 10, preferably injection molded from suitable plastic material having good electrical insulation properties, into which a blind T-shaped aperture or channel 12 is axially cored. Channel 12 is fully open at the front end of block 10 but only the wings or head of the "T" break through the rear block wall 14 to form a terminal-receiving slot 16, the base or leg of the T-channel stopping short of and terminating at the inside surface of wall 14. Block 10 has two relieved tapered projections 18,20 extending from a lateral wall 22 thereof adjacent the head of the T-channel, which projections serve as mounting lugs to snap-fasten block 10 to control bracket 24 with the open front end of channel 12 facing toward lever 26. A shorting terminal 36 having respective inner and outer ends 37,38 is received into the leg of T-shaped channel 12. Inner terminal end 37 is bent or kinked, as at 40, with the innermost end of bend 40 being turned upon itself to form a hairpin-shaped portion 42. The free state geometries of bend 40 and hairpin 42 are shown in FIG. 5 and differ from their configurations in assembly, best seen in FIG. 2, due to the terminal end 37 being compressed as it is pushed endwise into clip channel 12 until hairpin 42 abuts the inside surface of rear wall 14. Thus, in its assembled condition, terminal end 37 develops spring tension to bear at two points against the opposing inside face of lower block wall 22, i.e., at the ends 44,46 of bend 40, and at one point against the opposing roof 48 of channel 12, i.e., at the free end 52 of hairpin 42. Free end 52 is oriented relative to channel roof 48 so as to be slightly angulated or inclined with respect thereto as shown in FIG. 2, and is adapted to dig into roof 48 and to thus resist any forces tending to remove or withdraw terminal 36 from block 10. Outer terminal end 38 is formed into another hairpin-shaped portion having two ramp portions; a first portion 60 extending axially from bend end 44 through the open end of aperture 12 toward lever 26 and parallel to the plane of travel thereof, and a second portion 62 inclined with respect to portion 60 at an angle generally acute to said plane of travel or direction of motion of control lever 26.

The switch provided by the present invention, comprising insulator block 10 and terminal 36 described above, is adapted to receive a conventional spade terminal 54 in the rear end of the insulator block via slot 16. Spade terminal 54 is connected to the engine magneto (not shown) via conductor 55, and has an oval detent hole 56, at its center which, when the spade is inserted into slot 16, rides beneath the curved portion of hairpin 42 at bend terminus 46 until a portion of terminus 46 registers with hole 56 in the spade terminal, whereupon the bend is forced into the hole by the spring bias of the terminal wire. Spade terminal 54 is thus releasably locked to the grounding switch within insulator block 10 by this spring-detent feature of the invention. Bottom wall 22 extends outwardly of rear wall 14 to form a ledge 57 under which terminal 54 is positioned, thereby preventing terminal 54 from becoming bent or stressed into contact with bracket 24 and forming an insulation barrier between the terminal and bracket to protect against undesirable ignition grounding caused by moisture or corrosion, etc.

In operation, grounded control lever 26, as it is moved toward its engine shut-off position, is adapted to make electrical contact with terminal 36, and to thus electrically connect the magneto, via terminal 54 and conductor 55, to electrical ground, whereby generation of the engine ignition spark is prevented. Terminal 36 is first struck along end portion 62 by control lever 26 as the latter is moved toward the full-off throttle position. In FIG. 2, lever 26 and outer terminal end 38 are shown in solid lines at respective positions in which contact therebetween is imminent, and in phantom lines at the full-off throttle position. Thus, it will be noted that terminal end 38 is cammed upwardly and rides along an adjacent opposing relatively sharp edge 63 of control lever 26 as the latter is moved from initial to full engagement. Edge 63 is preferably a right angle edge of the type customarily imparted during die blanking or stamping of lever 26, and thus ordinarily is already available without requiring special machining of this part.

During movement of the control lever, terminal 36 is further stressed within clip channel 12 in a direction additive to the above-mentioned stresses imparted to the terminal in assembly, so that loading stresses caused by lever 26 are carried back into the portion of the terminal enclosed within the insulator block. Due to this mode of engagement, and due to the use of a small diameter spring wire for the grounding terminal, preferably on the order of 0.031 inch in diameter (No. 13 Gauge), the deflection imparted to the wire by control lever 26 as the latter moves to its full-off position develops a relatively high unit contact pressure in making grounding contact to the throttle lever. With this structure, terminal 36 is able to cut through and make electrical contact with control lever 26 despite the fact that the lever and/or spring wire may be covered by oil, dirt, grease, ice or corrosion, etc., thereby insuring positive grounding of the engine ignition system despite such adverse environmental conditions.

The invention claimed is:

1. In combination with an internal combustion engine having an ignition system and a carburetor control lever connected to electrical ground and movable between on and off positions, a switch for grounding said ignition system when said lever is moved to said off position comprising an elongated block of electrical insulating material fixedly disposed adjacent said off position of said control lever and having a channel formed lengthwise therein opening toward said lever, and a wire shorting terminal electrically connected to said ignition system having an inner end fixedly disposed within said channel aperture and an outer end extending from said channel aperture in the direction of said lever such that said wire terminal makes electrical contact with said control lever as said lever is moved to said off position.

2. The combination set forth in claim 1 wherein said wire terminal at said outer end includes a portion disposed adjacent the off position of said control lever and oriented at an acute angle with respect to the direction of motion of said lever such that said terminal portion is struck by an edge of said lever and is cammed over said lever edge as said lever is moved to said off position.

3. The combination set forth in claim 2 wherein said inner end of said wire terminal is looped such that said terminal is in spring-biased contact with opposing walls of said block aperture.

4. The combination set forth in claim 3 wherein the free end of said terminal internal to said block is disposed in abutment with an opposing block wall and is angulated with respect to said opposing block wall such that said end digs into said wall in a direction opposing removal of said terminal from said block.

5. The combination set forth in claim 3 wherein said block has a second aperture formed therein remotely of said lever, and wherein a spade terminal electrically connected to said ignition system is received in said second aperture, said loop at said inner terminal end registering with a corresponding detent depression in said spade terminal such that said inner loop yieldably retains said spade terminal within said block against an opposing block wall.

6. The combination set forth in claim 1 wherein said lever and block are mounted on a support and said block further includes two relieved tapered projections extending from an outside lateral wall thereof and received in corresponding holes in said support whereby said block is snap-mounted on said support.

7. In combination with an internal combustion engine having an ignition system and a throttle control lever connected to electrical ground and adapted to be moved by an engine operator to a position corresponding to an engine off condition, a switch for grounding said ignition system via said control lever as said lever is moved to said off position comprising an elongated insulation block having a blind T-shaped channel formed lengthwise therein and being fixedly disposed on said engine with said channel opening adjacent said off position, and a terminal formed of spring wire and having inner and outer ends, said inner end being in the form of a loop fixedly disposed within the leg of said T-shaped channel and electrically connected to the ignition signal, said outer terminal end extending from said channel opening toward said off position and being angulated with respect to the direction of motion of said control lever such that said outer end rides over an edge of said lever as said lever is moved to said off position.

8. The combination set forth in claim 7 wherein said inner terminal end comprises a V-shaped bend, the leg ends of said V-shaped bend being in spring-biased engagement with an opposing wall of said block channel.

9. The combination set forth in claim 8 wherein said inner terminal end further comprises a hairpin portion contiguous with and extending inwardly from said bend to abut a rear wall of said block, said hairpin portion having a free end in abutment with an opposing block side wall and angulated with respect thereto such that said free end digs into said opposing block side wall in a direction opposing removal of said terminal from said block.

10. The combination set forth in claim 9 further comprising a spade terminal electrically connected to said ignition system and having a detent depression formed therein, and wherein the head of said T-shaped channel extends through and forms a slot in said rear block wall, said spade terminal being received in said slot with said hairpin in registry with said detent depression and spring-clamping said spade terminal against an opposing block wall.

11. The combination set forth in claim 10 wherein said detent depression comprises an oval-shaped hole formed centrally in said spade terminal.

* * * * *

UNITED STATES PATENT OFFICE

CERTIFICATE OF CORRECTION

PATENT NO. : 4,022,180

DATED : May 10, 1977

INVENTOR(S) : David J. Bosma

It is certified that error appears in the above-identified patent and that said Letters Patent are hereby corrected as shown below:

Column 4, line 33: cancel "signal" and insert --system--

Signed and Sealed this

*Twentieth* Day of *September 1977*

[SEAL]

*Attest:*

RUTH C. MASON
*Attesting Officer*

LUTRELLE F. PARKER
*Acting Commissioner of Patents and Trademarks*